United States Patent
Yamamoto et al.

(10) Patent No.: US 7,395,888 B2
(45) Date of Patent: Jul. 8, 2008

(54) VEHICLE DRIVE DEVICE

(75) Inventors: Daisuke Yamamoto, Hitachinaka (JP); Kazuo Tahara, Hitachi (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 344 days.

(21) Appl. No.: 11/065,543

(22) Filed: Feb. 25, 2005

(65) Prior Publication Data

US 2005/0190524 A1    Sep. 1, 2005

(30) Foreign Application Priority Data

Feb. 27, 2004    (JP) .............................. 2004-052687

(51) Int. Cl.
*H01H 47/00* (2006.01)
(52) U.S. Cl. ..................................... 180/65.2; 180/65.4
(58) Field of Classification Search ................ 180/65.1, 180/65.2, 65.3, 65.4, 233, 248
See application file for complete search history.

(56) References Cited

U.S. PATENT DOCUMENTS

| 4,741,407 | A | * | 5/1988 | Torii et al. .................... 180/76 |
| 5,343,970 | A | * | 9/1994 | Severinsky ................. 180/65.2 |
| 5,450,921 | A | * | 9/1995 | Kameda et al. ............. 180/297 |
| 6,205,379 | B1 | * | 3/2001 | Morisawa et al. ............. 701/22 |
| 6,449,549 | B1 | * | 9/2002 | Dick ........................... 701/67 |
| 6,575,870 | B2 | * | 6/2003 | Kitano et al. .................. 477/3 |
| 6,864,652 | B2 | * | 3/2005 | Kubo et al. .................. 318/362 |
| 6,886,652 | B2 | * | 5/2005 | Maekawa et al. ........... 180/248 |
| 6,971,461 | B2 | * | 12/2005 | Yamamoto et al. ......... 180/65.2 |
| 7,082,358 | B2 | * | 7/2006 | Sugo ........................... 701/33 |
| 7,102,313 | B2 | * | 9/2006 | Kadota et al. ............... 318/465 |
| 7,178,618 | B2 | * | 2/2007 | Komeda et al. ............ 180/65.2 |

FOREIGN PATENT DOCUMENTS

| JP | 58-218802 A | 12/1983 |
| JP | 06-245322 | 9/1994 |
| JP | 2001-352795 | 12/2001 |

(Continued)

OTHER PUBLICATIONS

Chinese Office Action dated Sep. 8, 2006 with English translation (eight (8) pages).

(Continued)

*Primary Examiner*—Christopher P. Ellis
*Assistant Examiner*—Brian Swenson
(74) *Attorney, Agent, or Firm*—Crowell & Moring LLP

(57) ABSTRACT

A vehicle drive device comprises an actuator located between an electric motor and axles for driving the vehicle, a built-in power source for supplying electric power to the actuator, and a control means for controlling the drive of the actuator. The built-in power source can be consisted of a battery, and the actuator can be consisted of an electromagnetic clutch. Here, the vehicle drive device further comprises a boost means, such as a DC-DC converter, for boosting voltage of the built-in power source such as the battery. The output voltage of the boost means is supplied electric power to the actuator such as the electromagnetic clutch. The output voltage of the boost means can be also supplied the electric power to the field coil of the electric motor.

8 Claims, 7 Drawing Sheets

FOREIGN PATENT DOCUMENTS

| | | |
|---|---|---|
| JP | 2003-079004 | 3/2003 |
| JP | 2003-326997 | 11/2003 |

OTHER PUBLICATIONS

Japanese Office Action dated Sep. 26, 2006 (three (3) pages).

W. Hofmann et al., "Design and Control of an Hybrid Transmission with Electrical Power Splitting", Lausanne, European Conference on Power Electronics and Applications, Sep. 7, 1999, pp. 1-8, Conf. 8, EPE Association, XP-000890235, ISBN: 90-75815-04-2.

* cited by examiner

VEHICLE DRIVE DEVICE

CLAIM OF PRIORITY

The present application claims priority from Japanese application serial no. 2004-52687, filed on Feb. 27, 2004, the content of which is hereby incorporated by reference into this application.

FIELD OF THE INVENTION

The present invention relates to a vehicle drive device and specifically to a vehicle drive device suitable for driving an actuator used for controlling a vehicle.

BACKGROUND OF THE INVENTION

Conventionally, as shown in an electric four-wheel drive vehicle, a well-known vehicle drive device in which front wheels are driven by an internal combustion engine and rear wheels are driven by an electric motor is commonly equipped with an electromagnetic clutch as an actuator for switching the transfer and non-transfer of the drive force between rear wheels and the electric motor for driving the rear wheels. The vehicle drive device is, for example, described in Japanese Patent Laid-open No. 2003-326997. Generally, a battery supplies electric power to the coil located in the electromagnetic clutch.

On the other hand, there is a well-known conventional vehicle drive device as described in Japanese Patent Laid-open No. 2003-079004. In the vehicle drive device, when a generator's output voltage is less than a prescribed voltage equivalent to a storage battery's output voltage, the electric power outputted from the generator's rectification circuit is boosted to a prescribed voltage by using a boost circuit, such as a DC/DC converter, and the amount of current generated at the low-speed start when the number of motor revolutions is few is increased, thereby high motor torque is obtained.

However, in the vehicle drive device described in Japanese Patent Laid-open No. 2003-079004, the voltage outputted by the generator is boosted, thereby causing the input voltage of the boost means to increase up to the maximum output voltage of the generator and also causing output voltage of the generator to change due to fluctuations of the load of the motor. As a result, there are problems such as increase in conversion noise, power loss and the size of the parts. Therefore, it is necessary to use a boost means which has variable input and output and can withstand high pressure.

Another well-known vehicle drive device is described in FIG. 4 of Japanese Patent Laid-open No. 2001-352795. In the vehicle drive device, the output of a power source such as a battery is boosted by a DC/DC converter and supplied to a field coil of the electric DC motor. This configuration keeps battery voltage almost constant, which eliminates the above problems and also makes it possible to increase the motor's output torque.

SUMMARY OF THE INVENTION

However, when an electric motor's output torque is increased by the method described in Japanese Patent Laid-open No. 2001-352795, if a battery is used as a power source and the output is supplied to the coil of the electromagnetic clutch located between the electric motor and the rear wheels, as described in Japanese Patent Laid-open No. 2003-326997, a problem arises. It was found that the electromagnetic clutch's engagement force is not sufficient and the electric motor's output torque is not sufficiently transferred to the wheels. As a result, the force to transfer torque is decreased.

Similarly, an electromagnetic brake installed in a vehicle drive device or an actuator, such as an electromagnetic limited-slip differential gear, functions as a driven body driven by battery voltage. However, it was found that if a battery is used as a power source to supply electric power to those driven components, performance of those components will be less than optimal.

The object of the present invention is to provide a vehicle drive device equipped with a high-performance actuator.

(1) To achieve the above object, a vehicle drive device according to the present invention is equipped with an actuator used for driving the vehicle, built-in power source for supplying electric power to the actuator, and a control means for controlling the drive of the actuator, wherein a boost means for boosting the output voltage of the built-in power source is provided and the electric power boosted by the boost means can be supplied to the actuator.

This configuration makes it possible to reduce the size of the actuator as well as heat generation, thereby enabling high-performance.

(2) In the above item 1, preferably, the actuator is an electromagnetic clutch.

(3) In the above item 2, preferably, a vehicle drive device according to the present invention is equipped with a high-output driving generator driven by an internal combustion engine and an electric motor driven by the output voltage supplied by the high-output driving generator, wherein the electromagnetic clutch is located between the electric motor and axles, and the electric power boosted by the boost means is supplied to the field coil of the high-output driving generator and the field coil of the electric motor.

(4) In the above item 1, preferably, the actuator is an electromagnetic brake.

(5) In the above item 1, preferably, the actuator is an electromagnetic limited-slip differential gear.

(6) To achieve the above object, a vehicle drive device according to the present invention is equipped with an actuator used for driving the vehicle, built-in power source for supplying electric power to the actuator, and a control means for controlling the drive of the actuator, wherein a boost means for boosting output voltage of the built-in power source, a high-output driving generator driven by an internal combustion engine, and an electric alternating current (AC) motor driven by the output voltage supplied by the high-output driving generator are provided, and the electric power boosted by the boost means is supplied to the field coil of the high-output driving generator and the field coil of the electric AC motor.

According to the present invention, it is possible to provide a vehicle drive device that is equipped with a high-performance actuator.

Other objects, advantages and novel features of the present invention will become apparent from the following detailed description of the invention when considered in conjunction with the accompanying drawings.

DESCRIPTION OF THE PREFERRED EMBODIMENTS

Hereafter, with reference to FIGS. 1 through 5, configuration and operations of a vehicle drive device according to an embodiment of the present invention will be explained.

Figure 1:
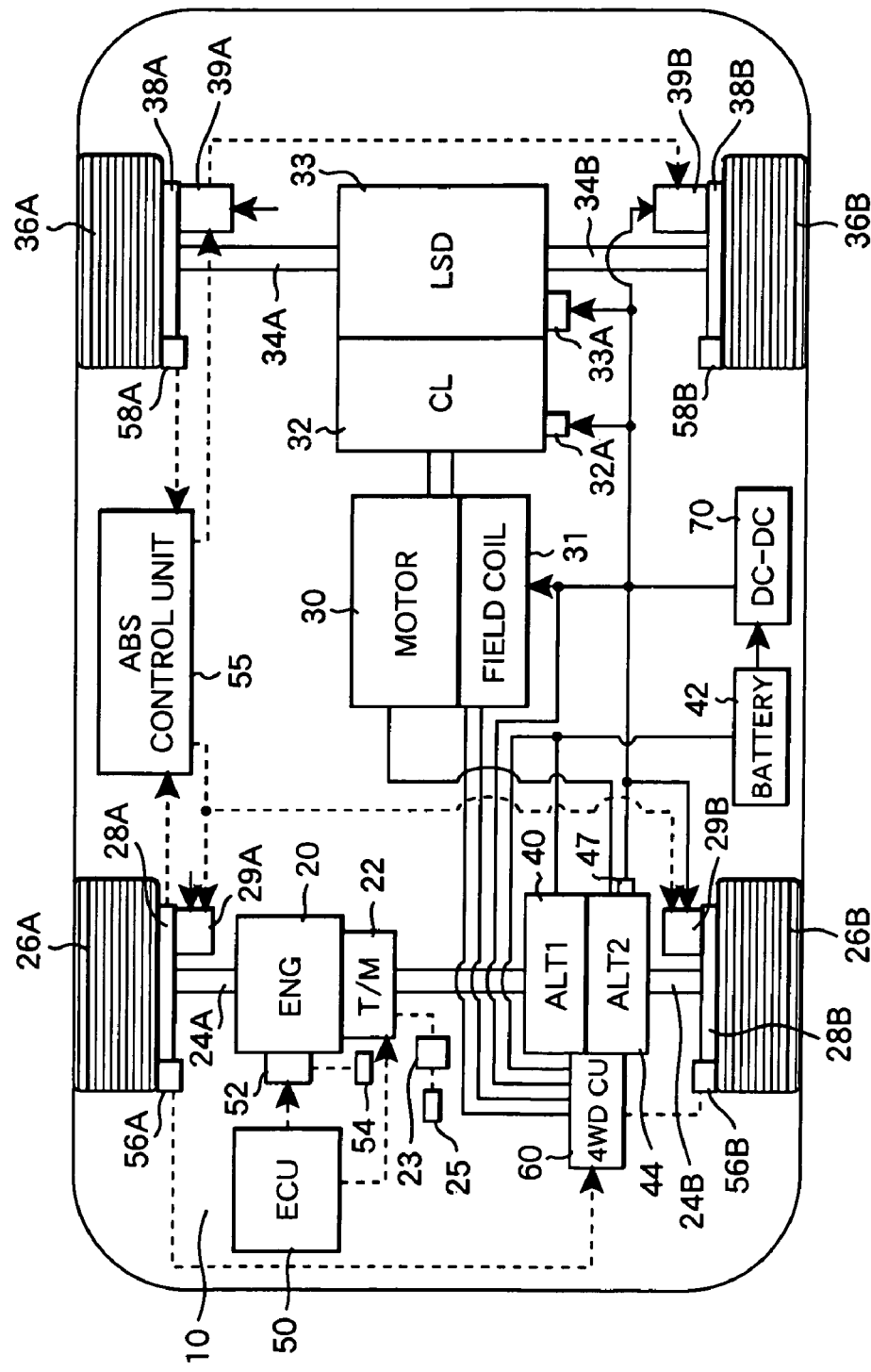
FIG. 1 is a schematic diagram showing the configuration of an electric four-wheel drive vehicle that uses a vehicle drive device according to an embodiment of the present invention.

First, by referring to FIG. 1, configuration of an electric four-wheel drive vehicle which uses a vehicle drive device according to this embodiment.

FIG. 1 is a schematic diagram showing the configuration of an electric four-wheel drive vehicle which uses a vehicle drive device according to an embodiment of the present invention.

A four-wheel drive vehicle 10 is equipped with an engine 20 and an electric motor 30. The drive force of an engine 20 is transferred to front wheels 26A and 26B, for example, via a transmission 22 and first axles 24A and 24B, thereby driving the front wheels 26A and 26B. A drive force of an electric motor 30 is transferred to rear wheels 36A and 369, for example, via an electromagnetic clutch 32, electromagnetic limited-slip differential gear (LSD) 33 and second axles 34A and 343, thereby driving the rear wheels 36A and 363. When the electromagnetic limited-slip differential gear 33 is engaged with the electromagnetic clutch 32, a rotational force of the electric motor 30 is transferred to the rear-wheel axles 34A and 349 via the electromagnetic clutch 32 and the electromagnetic limited-slip differential gear 33, thereby driving the rear wheels 36A and 36B. The electromagnetic clutch 32 is capable of controlling an engagement force of the clutch by controlling the amount of current flowing through the electromagnetic clutch coil 32A. When the electromagnetic clutch 32 is disengaged, the electric motor 30 is mechanically separated from the rear wheels 36A and 36B, and accordingly, the rear wheels 36A and 36B do not convey the drive force to the road. The electric motor 30 incorporates an electric motor field coil 31. For example, an electric AC motor which switches efficiently and easily between forward and reverse rotations is used. Furthermore, an inverter, not shown, is disposed between the generator 44 and the electric motor 30 to convert current outputted from a high-output driving generator 44 into alternating current.

In the above explanation, a four-wheel drive vehicle in which front wheels 26A and 26B are driven by an engine 20 and rear wheels 36A and 36B are driven by an electric motor 30 is described as an example. However, front wheels can be driven by an electric motor and rear wheels can be driven by an engine. Furthermore, a vehicle with six wheels or more, such as a truck, or a tractor vehicle, such as a trailer, is also applicable.

An auxiliary generator (ALT1) 40 and auxiliary battery 42 which make up of a normal charging and generating system are disposed in an engine room, and the output from the auxiliary generator 40 driven by an engine 20 is stored in the auxiliary battery 42. A high-output driving generator (ALT2) 44 driven by an engine 20 via the belt is disposed in the vicinity of the auxiliary generator 40. The output from the high-output driving generator 44 drives the electric motor 30. The auxiliary generator 40 is, for example, an ordinary 12-V and 2-kW generator, and the high-output driving generator 44 is a generator, such as a 36-V and 6-kW generator, which enables higher outputs than the auxiliary generator 40.

The output of the engine 20 is controlled by an electronically-controlled throttle 52 driven by the instructions of the engine control unit (ECU) 50. The electronically-controlled throttle 52 has an accelerator opening sensor 54 which detects the degree of opening of the accelerator. When a mechanically-linked accelerator pedal and throttle are used instead of an electronically-controlled throttle, the accelerator pedal can be equipped with an accelerator opening sensor. The ECU 50 controls the amount of fuel injection supplied to the engine 20 and the engine ignition timing.

The ECU 50 also controls the transmission 22. The transmission 22 is an automatic transmission which is automatically controlled by the select lever 23 so as to become a selected gear ratio. The position of the select lever 23 is detected by a gear position detection sensor 25. As a transmission 22, a manual transmission (MT) or a continuously variable transmission (CVT) can be used.

Each of the front wheels 26A and 26B and rear wheels 36A and 36B has a rotary sensor 56A, 56B, 58A and 58B which detects rotation speed and rotational direction. The rotary sensor 56A, 56B, 58A and 58B is provided for each wheel, however, it can be provided for either a front-wheel axle or rear-wheel axle, or both.

An ABS control unit 55 detects the lock condition of the wheels based on the number of revolutions of each wheel 26A, 26B, 36A and 36B detected by each rotary sensor 56A, 56B, 58A and 58B. When a wheel is locked, the ABS control unit 55 issues control commands to electromagnetic solenoids 29A, 29B, 39A and 39B, thereby controlling the brake force generated at the electromagnetic brakes 28A, 28B, 38A and 38B.

The foul-wheel drive control circuit (4WDCU) 60 calculates vehicle speed based on the rotation speed of the wheels 26A and 26B, 36A and 36B detected by rotary sensors 56A, 56B, 58A and 58B, and controls the high-output driving generator 44 and electric motor 30 based on the calculated vehicle speed. The 4EDCU 60 detects rear wheel slipping according to the difference between the front wheel speed detected by rotary sensors 56A and 56B of the front wheels 26A and 26B and the rear wheel speed detected by rotary sensors 58A and 58B of the rear wheels 36A and 365. And, in the case of rear wheel slipping, the 4WDCU 60 controls field current of the high-output driving generator 44 and the electric motor 30, thereby controlling drive torque outputted from the electric motor 30. Details of the control executed by the foul-wheel drive control circuit (4WDCU) 60 will be explained later with reference to FIGS. 3 and 4.

The DC/DC converter 70 boosts terminal voltage of the battery 42 and supplies electric power to a field coil 47 of the high-output driving generator 44, field coil 31 of the electric motor 30, coil 32A of the electromagnetic clutch 32, coil 33A of the electromagnetic limited-slip differential gear 33, and coils of the brakes 28A, 285, 38A and 38B.

Next, with reference to FIG. 2, the configuration of the vehicle drive device according to this embodiment will be explained.

Figure 2:
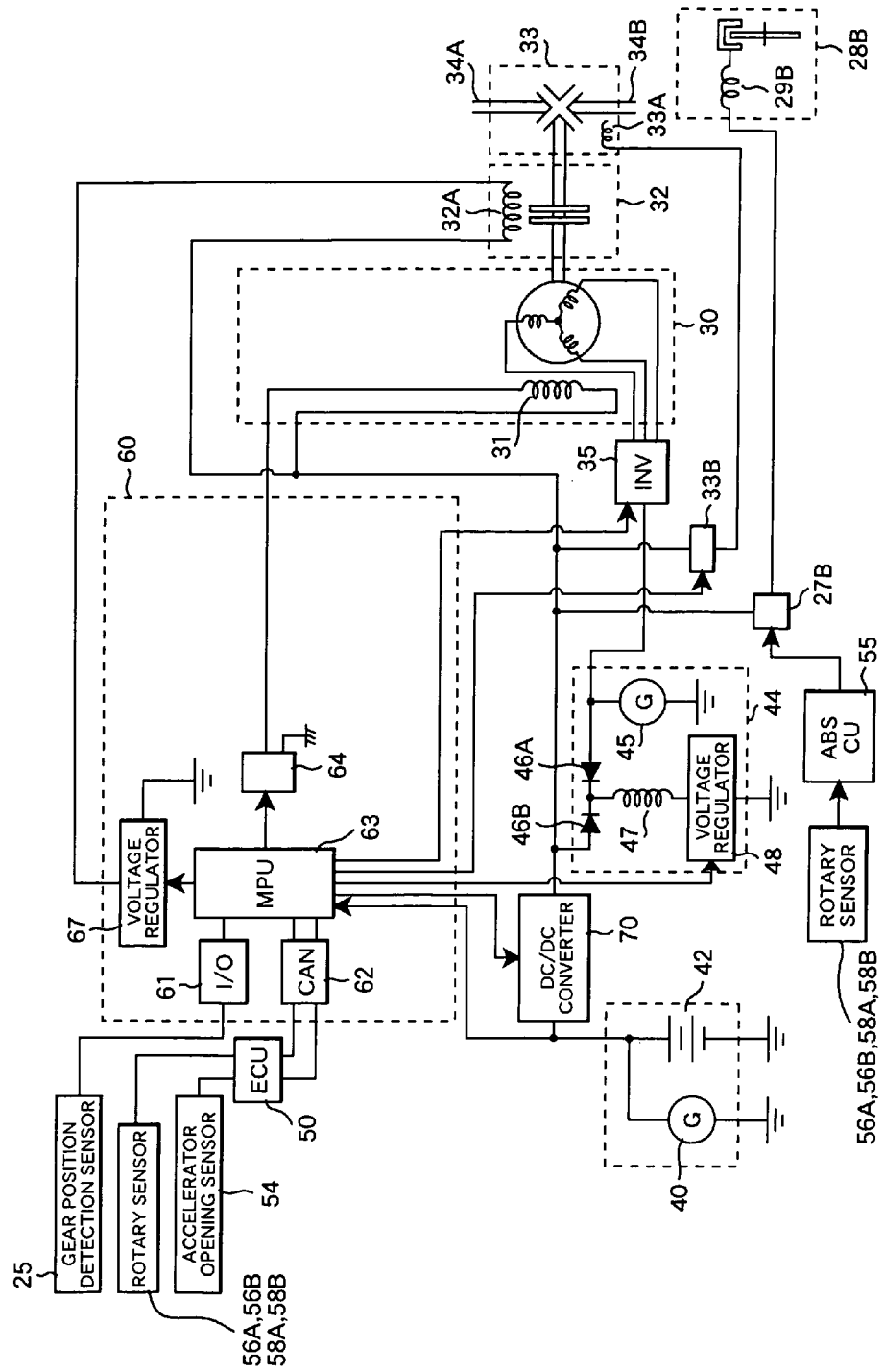
FIG. 2 is a schematic diagram showing the configuration of a vehicle drive device according to an embodiment of the present invention.

FIG. 2 is a schematic diagram showing the configuration of a vehicle drive device according to an embodiment of the present invention. Items in FIG. 2 that have identical numbers to items in FIG. 1 are identical.

The power generated by an auxiliary generator 40 is stored in an auxiliary battery 42. The output voltage is, for example, 12 V. The DC/DC converter 70 boosts terminal voltage of the battery 42 and supplies the power to the field coil 47 of the high-output driving generator 44. The boosted voltage is, for example, 24 V. Detailed configuration of the DC/DC converter 70 will be described later by referring to FIG. 5. The high-output driving generator 44 incorporates an armature coil 45, diodes 46A and 46B, a field coil 47, and a field coil voltage regulator 48. Output voltage of the DC/DC converter 70 is supplied to the field coil 47 via the diode 46A.

As FIG. 1 shows, the high-output driving generator 44 is driven by an engine. The output from the armature coil is converted into AC voltage by means of an inverter circuit (INV) 35 and is supplied to an electric motor 30, and is also supplied to the field coil 47 of the generator 44 via a diode 46A. As a voltage inputted into the field coil 47, diodes 46A and 46B automatically select either output voltage of the DC/DC converter 70 or that of the generator armature coil 45 whichever is higher. The voltage regulator 48 is driven by the MPU 63 of the 4WDC/U 60 and controls voltage inputted into the field coil. By controlling voltage of the field coil, it is possible to change the field current (amount of field magnetic flux), thereby controlling current supplied to the electric motor 30.

The voltage outputted by the DC/DC converter 70 is supplied to the field coil 31 of the electric motor 30 via an H-bridge circuit 66 of the 4WDCU 60. The H-bridge circuit 66 consists of four bridge-connected MOSFETS (MOS1, MOS2, MOS3, MOS4).

The 4WDCU 60 is equipped with an I/O circuit 61, CAN circuit 62, MPU 63, and voltage regulators 64 and 67. The MPU 63 controls field current that flows through the field coil 31 of the electric motor 30 by means of a voltage regulator 64 so that the torque generated by an electric motor 30 conforms to the required value. To reverse a vehicle, it is possible to reverse the rotational direction by shifting the phase by means of an inverter 35.

Furthermore, the voltage outputted by the DC/DC converter 70 is supplied to a coil 32A of the electromagnetic clutch 32. Voltage that flows through the coil 32A is regulated by a voltage regulator 67.

Herein, operations of the 4WDCU 60 will be explained. Gear position information detected by a gear position detection sensor 25 is fetched by the MPU 63 via an I/O circuit 61. Information of rotation speed and direction of the wheels 26A and 26B, 36A and 36B detected by rotary sensors 56A, 56B, 58A and 589 as well as information of accelerator opening detected by an accelerator opening sensor 54 are first fetched by an engine control unit (ECU) 50 and calculated, and then fetched by the MPU 63 via the CAN circuit 62.

The MPU 63 has the CPU and a memory for storing the program and data for controlling the electric motor. Based on the inputted information, the MPU 63 calculates vehicle speed and electric power outputted by the high-output driving generator 44, and calculates generator field voltage that satisfies the power output of the generator. The calculated generator field voltage is inputted into the voltage regulator 48 as a generator field voltage command. The voltage regulator 48 controls the field current which is supplied to the field coil 47 of the high-output driving generator 44 based on the generator field voltage command. Thereby the input voltage of the electric motor 30 is controlled. Furthermore, MPU 63 calculates the electric motor field voltage and output it to the voltage regulator 64 so that the characteristics of the electric motor 30 conform to the required value. The voltage regulator 64 regulates field current that flows through the field coil 31 of the electric motor 30. Furthermore, the MPU 63 creates the engagement force control command of the electromagnetic clutch 32, and controls current which is supplied to the electromagnetic coil 32A of the electromagnetic clutch 32. Moreover, the MPU 63 also controls DC-AC power conversion in the inverter circuit 35.

The torque generated by the electric motor 30 is controlled in three ways: control of the field current of the high-output driving generator 44, control of the field current of the electric motor 30, and the phase control of three-phase alternating current in the inverter 35. For example, when necessary motor speed is low and necessary torque is high in the case as the start of a vehicle, it is possible to make the motor speed low and make the output torque high by reducing voltage outputted by the high-output driving generator 44 while increasing the amount of field current flowing through the field coil 31 of the electric motor 30 so as to increase the output current. When a vehicle is traveling, high speed and low torque is required for the electric motor. This condition can be achieved by increasing voltage outputted by the high-output driving generator 44 and reducing the output current. Furthermore, by reducing the field current of the electric motor 30, it is possible to increase motor speed while improving the responsiveness of the vehicle during traveling. Moreover, when a required torque distribution value for the front wheel 26 is higher than that for the rear wheel 36, it is possible to make torque distribution of the front wheel 26 and rear wheel 36 variable by reducing the field current of the high-output driving generator 44. Furthermore, by controlling the inverter 35 to control the phase of the three-phase alternating current according to the motor's rotation position, that is, by executing the field weakening control for controlling the phase of the armature current so as to control field magnetic flux, it is possible to increase accuracy of the field control specifically in the high rotation range where the amount of field magnetic flux should be low. As a result, it is possible to accurately and effectively control torque over a wide range. Furthermore, the use of an electric AC motor is more efficient than the use of an electric DC motor because there is no brush loss in an AC electric motor, and the efficiency can be further increased by advancing the phase according to the motor speed. Moreover, the above explanation describes a separately-excited AC motor that can use both the magnetic field and the armature for control. However, an AC motor excited by an interior permanent magnet can be used because the field weakening control is possible in a high rotation range by simply controlling the phase of the armature current in response to the position signal.

Next, with reference to FIGS. 3 and 4, operations of a vehicle drive device according to this embodiment will be explained.

Figure 3:
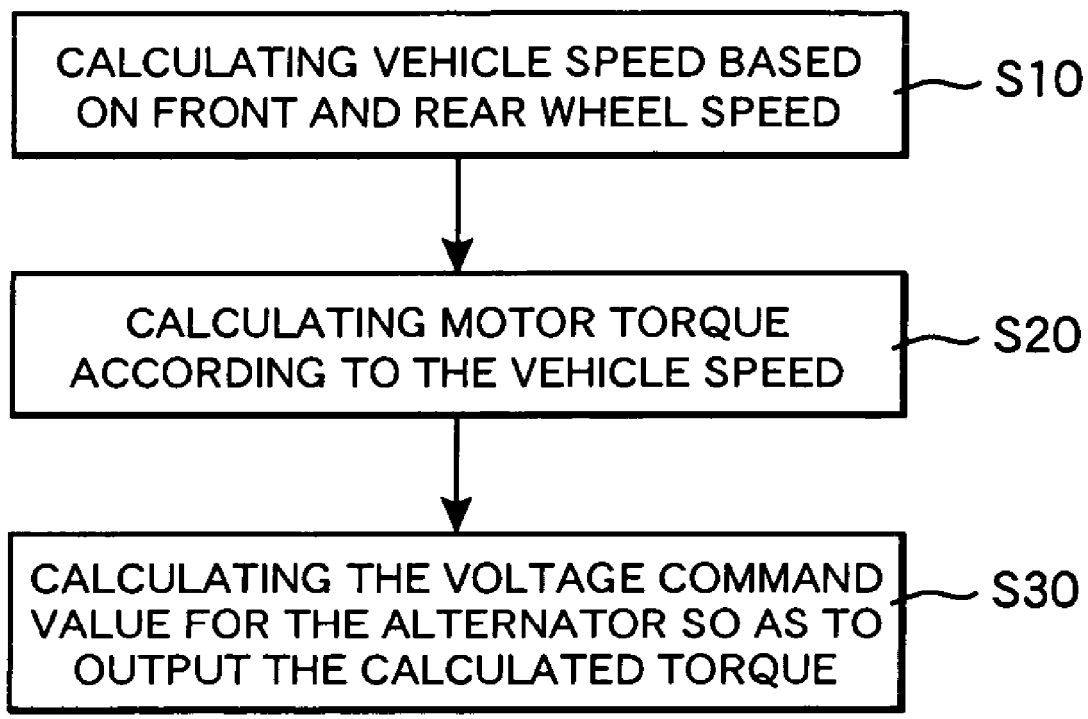
FIG. 3 is a flow chart showing the control mechanism of the 4WDCU 60 incorporated in the vehicle drive device according to an embodiment of the present invention.
Figure 4:
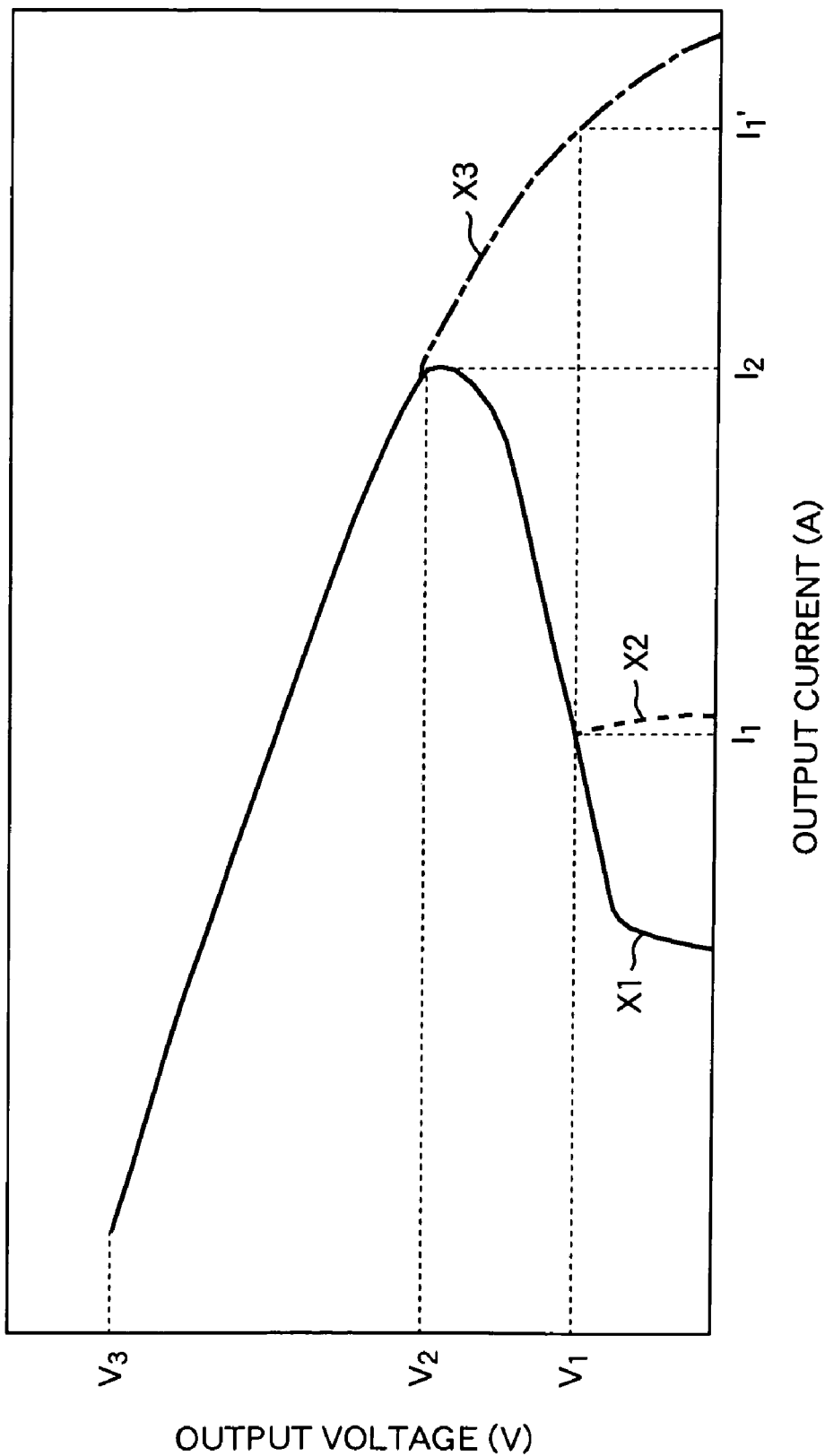
FIG. 4 is a characteristic diagram of a high-output generator used for the vehicle drive device according to an embodiment of the present invention.

FIG. 3 is a flow chart showing the control mechanism of the 4WDCU 60 incorporated in the vehicle drive device according to an embodiment of the present invention. FIG. 4 is a characteristic diagram of a high-output generator used for a vehicle drive device according to an embodiment of the present invention.

In step s10 in FIG. 3, the 4WDCU 60 calculates vehicle speed by determining a low speed as a vehicle speed, for example, based on rotation speed information of front and rear axles inputted by rotary sensors 56A, 56B, 58A and 58B.

Next, in step s20, the 4WDCU 60 calculates motor drive torque required in response to the traveling circumstances which have been determined in step s10.

In step s30, the 4WDCU 60 calculates the voltage value commanded for the driving generator 44 so as to obtain the calculated motor drive torque, and outputs the value to the driving generator 44. The driving generator 44 internally executes feedback control so that the output voltage becomes the command value, and the generator outputs the voltage V to the electric motor 30. This voltage V causes actual torque of the electric motor 30 to be inputted into the rear wheel 36 to output actual wheel speed, thereby executing feedback control of the entire system.

Next, with reference to FIG. 4, characteristics of the high-output generator will be explained. In FIG. 4, the output voltage is outputted from the high-output driving generator 44, and it is considered as an input voltage of the electric motor 30 excluding the wiring resistance. In FIG. 4, solid line X1 shows the output voltage—output current characteristics during the self excitation in which voltage outputted by the high-output driving generator 44 is directly supplied to the field coil. Dotted line X2 shows the output voltage—output current characteristics when the field coil 47 of the high-output driving generator is separately excited (separate excitation by power source) by the voltage V1 of the constant-voltage power source 49. Dashed line X3 shows the output voltage—output current characteristics when output voltage of the constant-voltage power source is boosted (separate excitation by boosted power source) by a boost circuit, such as a DC/DC converter 70, to the nearly equivalent to the output voltage V2 which causes maximum output current I2 in the self excitation condition, and the field coil 47 of the high-output driving generator is separately excited by the voltage. Herein, if output voltage of the high-output driving generator 44 exceeds V1 in the case of separate excitation by the power source or exceeds V2 in the case of separate excitation by the boosted power source, diodes 46A and 46B select the voltage outputted by the high-output driving generator 44 as the voltage that is inputted into the field coil 47 of the high-output driving generator. As a consequence, the generator 44 enters the self-excitation condition.

When a vehicle is being driven or getting out of rut, high torque is required. However, when vehicle speed is low, the number of revolutions of the electric motor 30 also decreases, causing induction voltage of the electric motor 30 to decrease. At that time, engine speed is also low, and therefore, voltage outputted by the driving generator 44 is also low, nearly V1 or below V1. It is indicated that the amount of output current when the power source is boosted is greatly higher than that of output current when output voltage is low. (Ex. I1<<I1': when output voltage is V1). Magnitude of the motor torque is according to the amount of flowing current. Accordingly, higher torque can be outputted when the power source is boosted and the coil is separately excited by the voltage.

As stated above, output voltage of the DC/DC converter 70 is supplied to the field coil 32A of the driving generator 44, and therefore, the driving generator 44 can output a high voltage. In addition, by controlling field current of the driving generator 44 so as to control output voltage and output current of the generator, it is possible to increase output current as indicated by the dashed line X3. Accordingly, output torque of the electric motor 30 driven by the voltage outputted from the generator 44 can be increased. Furthermore, by controlling field current of the electric motor 30, the electric motor 30 can rotate from low speed to high speed, thereby increasing the motor drive range.

Again in FIG. 2, in this embodiment, an electromagnetic clutch 32 can change the engagement force of the clutch by controlling current flowing through the electromagnetic clutch coil 32A by means of the 4WDC/U 60. The power supply line of the coil 32A of the electromagnetic clutch 32 is connected to the output terminal of the DC/DC converter 70. Therefore, voltage that is supplied to the coil 32A of the electromagnetic clutch 32 can be increased, thereby the fastening power of magnetic clutch of 32 can be increased further than the case in which DC-DC converter 70 is not used. As stated above, when field currents of the driving generator 44 and electric motor 30 are controlled and output torque of the electric motor 30 becomes high, if the engagement force of the electromagnetic clutch 32 is weak, the clutch slips, which prevents torque of the electric motor 30 from being effectively transferred to the wheels and causes losses. However, by making the engagement force of the electromagnetic clutch 32 strong as shown in this embodiment, it is possible to reduce losses caused by the clutch slipping. Furthermore, when voltage that is applied to the coil 32A of the electromagnetic clutch 32 is low because a DC/DC converter 70 is not used, it is possible to increase the engagement force of the electromagnetic clutch by increasing current flowing through the coil 32A. However, in this case, a large current needs to be provided. Consequently, problems arise in that the size of the electromagnetic clutch increases and the amount of heat generated becomes high due to large current consumption. On the contrary, by using a DC/DC converter 70, as shown in this embodiment, the engagement force can be increased and the size of the electromagnetic clutch can be reduced, thereby reducing the amount of heat generated.

Furthermore, by controlling the engagement force of the electromagnetic clutch 32 by means of a coil voltage regulator 67 without depending on the fluctuating power generated by the high-output driving generator 44, it is possible to forcibly disengage the mechanical connection between rear wheels 36A and 36B and the electric motor 30 when the four-wheel drive function is not necessary. For example, when vehicle speed becomes 20 kilometer per hour, the electromagnetic clutch 32 is turned off and only front wheels are driven. By doing so, durability of the electric motor 30 can be increased in comparison with the system in which the electric motor is in operation during the entire range of the vehicle's speed. Furthermore, once the electromagnetic clutch 32 is disengaged, the electric motor 30 is not used. Therefore, it is possible to switch to the high-output driving generator 44 and uses it as a charging device or auxiliary power source.

As shown in FIG. 2, voltage boosted by the DC/DC converter 70 is supplied to the coil 33A of the electromagnetic limited-slip differential gear (LSD) 33 via a voltage regulator 33B. When voltage applied to the coil 33A of the LSD 33 is low because a DC/DC converter 70 is not used, it is possible to operate the LSD 33 by increasing the current flowing through the coil 33A. However, in this case, a large current needs to be provided. Consequently, problems arise in that the size of the LSD 33 increases and the amount of heat generated becomes high due to large current consumption. On the contrary, by using a DC/DC converter 70, as shown in this embodiment, the size of the electromagnetic LSD can be reduced, thereby reducing the amount of heat generated.

Moreover, as shown in FIG. 2, voltage boosted by a DC/DC converter 70 is supplied to the coil 29B of the electromagnetic brake 28B via a voltage regulator 27B. A vehicle, shown in FIG. 1 (not shown in FIG. 2), is equipped with four electromagnetic brakes 28A, 28B, 38A and 38B, and voltage boosted by a DC/DC converter 70 is supplied to each coil of each electromagnetic brake 28A, 38A and 38B via a voltage regulator 27B. When slipping occurs, the ABSCU 55 regulates the brake force applied to each of the four wheels according to each wheel's speed detected by rotary sensors 56A, 56B, 58A and 58B, thereby creating control to prevent the vehicle from slipping. When voltage that is applied to the coil 29B of the electromagnetic brake 28B is low because a DC/DC converter 70 is not used, it is possible to increase the force of the electromagnetic brake 28B by increasing current flowing through the coil 29B. However, in this case, a large current needs to be provided. Consequently, problems arise in that the size of the electromagnetic brake 28B increases and the amount of heat generated becomes high due to large current consumption. On the contrary, by using a DC/DC converter 70, as shown in this embodiment, the size of the electromagnetic brake can be reduced, thereby reducing the amount of heat generated.

Next, with reference to FIG. 5, operations of a DC/DC converter 70 used for a vehicle drive device according to this embodiment will be explained.

Figure 5:
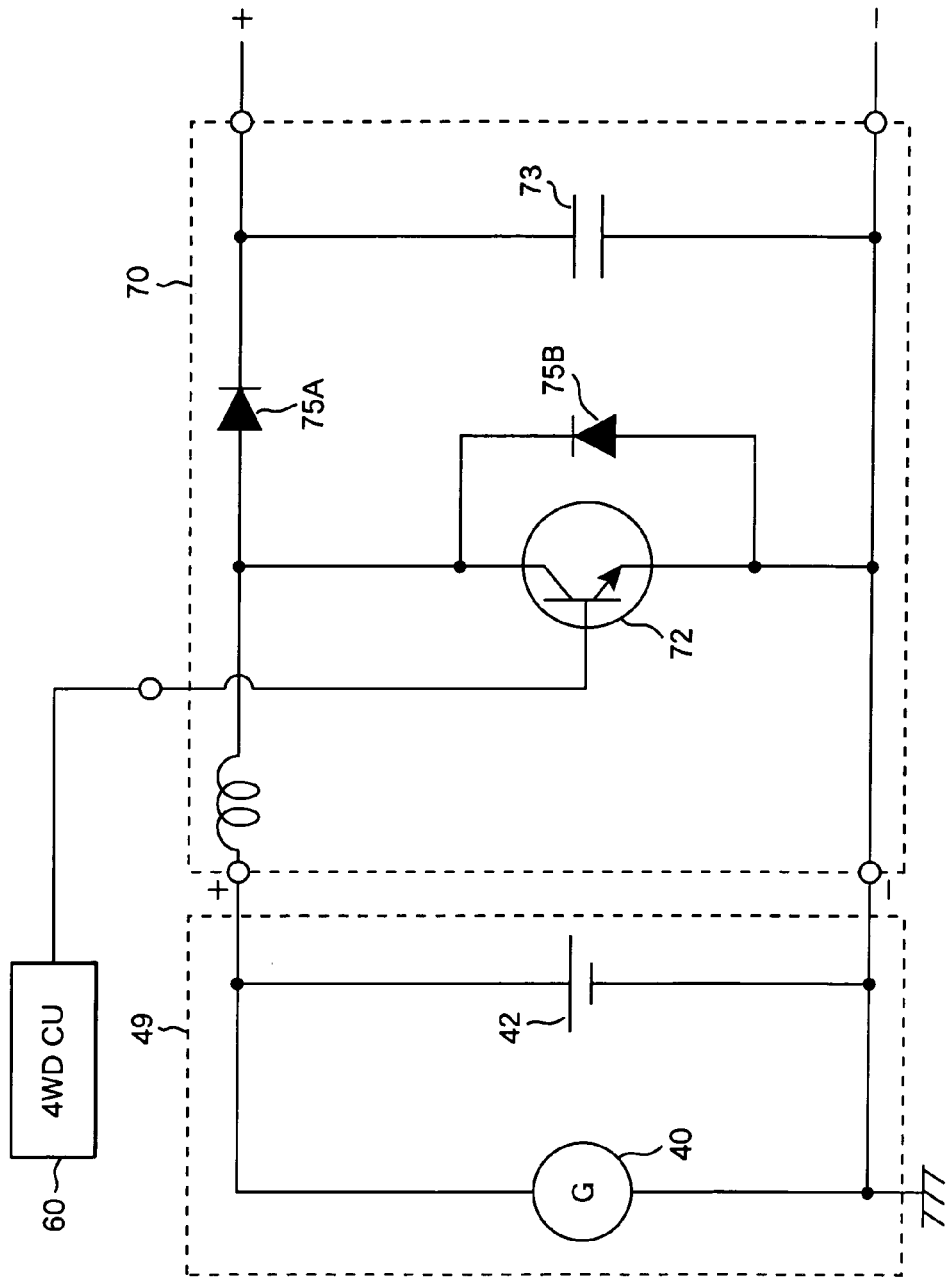
FIG. 5 is a circuit diagram showing the configuration of a DC/DC converter used for the vehicle drive device according to an embodiment of the present invention.

FIG. 5 is a circuit diagram showing the configuration of the DC/DC converter used for a vehicle drive device according to an embodiment of the present invention. Items in FIG. 5 that have identical numbers to items in FIG. 1 are identical.

The power source 49 consists of an auxiliary generator 40 and an auxiliary battery 42, and is made up of a general charge and discharge system among electric loads on the 12-V power source. The DC/DC converter 70 is connected to the power source 49 consisting of a battery 42 and auxiliary generator 40, and to the 4WDCU 60. The DC/DC converter 70 is equipped with a coil 71, transistor 72, capacitor 73, and diodes 75A and 75B. The coil 71 is connected to the input terminal of the DC/DC converter 70. The transistor 72 and capacitor 73 are connected in parallel with the power source 49 and loads. Furthermore, a diode 75A is connected between the transistor 72 and the positive end of the capacitor 73, and a diode 75B is connected in parallel with the transistor 72.

When the transistor 72 is oscillated by the 4WDCU 60 by means of the pulse-width modulation (PWM), the electric power is stored in the coil 71 when the switch is turned on, and the stored power is discharged when the switch is turned off. As a result, boosted voltage (steady-state and no loss), which is calculated as shown below, can be obtained.

$$V\text{out} = (T\text{on} + T\text{off})/T\text{off} \times V\text{in} \quad (1)$$

Herein, Vout is a voltage outputted from the DC/DC converter, Ton is time duration when the transistor 72 is turned on, Toff is time duration when the transistor 72 is turned off, and Vin is a voltage inputted into the DC/DC converter. For example, if Ton=Toff, the output voltage is boosted 200%.

Furthermore, current outputted from the diode 75 is smoothed by a capacitor 73, and current shown below flows when the voltage is steady and there is no power loss.

$$I\text{out} = I\text{in} \cdot (V\text{in}/V\text{out}) \quad (2)$$

Herein, Iout is an output current of the DC/DC converter, and Iin is an input current of the DC/DC converter.

FIG. 5 shows a non-insulative DC/DC converter, however, an insulative DC/DC converter can be used. A boost-type DC/DC converter that uses a transformer can also be used.

Furthermore, instead of using an electric motor 30, it is possible to use an electric generator (motor/generator) in such a way that an electric generator is utilized as a generator during high-speed traveling or climbing hills, and the generator generates power and charges the battery, thereby obtaining a braking force such as regenerative braking and power generation braking force.

As stated above, according to this embodiment, output voltage boosted by a DC/DC converter operates an electromagnetic clutch, thereby making it possible to increase the engagement force of the electromagnetic clutch. Specifically, in the configuration in which output torque of the electric motor can be increased by controlling field voltage of the high-output generator and electric motor by means of output voltage boosted by a DC/DC converter, it is possible to reduce slipping of the electromagnetic clutch and effectively use output torque of the electric motor as drive torque.

Furthermore, by operating an electromagnetic limited-slip differential gear by means of output voltage boosted by a DC/DC converter, it is possible to reduce the size of the electromagnetic limited-slip differential gear and also reduce heat generation.

Moreover, by operating an electromagnetic brake by means of output voltage boosted by a DC/DC converter, it is possible to reduce the size of the electromagnetic brake and also reduce heat generation.

Next, with reference to FIG. 6, the control mechanism of the vehicle drive device according to this embodiment will be explained.

Figure 6:
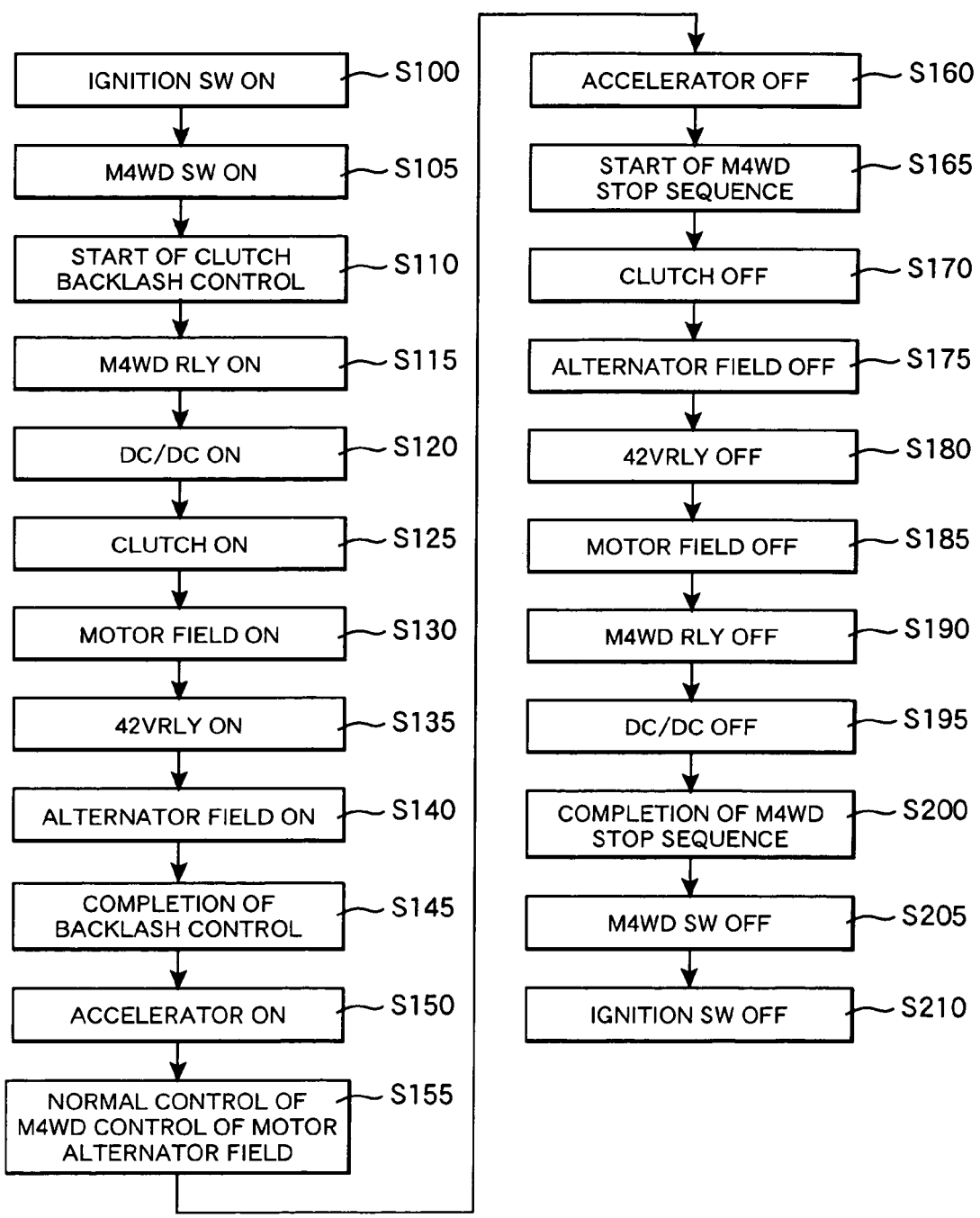
FIG. 6 is a flow chart showing the control mechanism of the vehicle drive device according to an embodiment of the present invention.

FIG. 6 is a flow chart showing the control mechanism of the vehicle drive device according to an embodiment of the present invention.

When a driver of an electric vehicle turns on the ignition switch (SW) in step s100 and the driver of the same electric vehicle turns on the manual 4WD switch (M 4WD SW) in step s105, the 4WDCU 60 starts controlling to reduce backlash of the clutch 32. The manual 4WD switch, not shown in FIG. 1, is a switch for a driver at any time to switch between 2WD and 4WD. When a driver wants the electric four-wheel vehicle to operate in four-wheel drive, turning on the switch will operate the vehicle as an electric four-wheel drive vehicle. Turning the switch off will allow only an engine to drive the vehicle. In the initial condition of the clutch 32, backlash has not been reduced, and therefore, if the vehicle starts in that condition, an impact may occur. Accordingly, backlash reduction control of the clutch 32 is executed in step s110.

When backlash reduction control of the clutch 32 starts, in step s115, the 4WDCU 60 turns on the power-source relay (M4WD RLY), not shown, of the manual 4WD control system. Subsequently, electric power is supplied to the alternator field and the motor field, thereby enabling the backlash reduction control. Then, in step s120, the 4WDCU 60 turns on the DC/DC converter 70, and then the 4WDCU 60 turns on and off the transistor switch 72 of the DC/DC converter 70, shown in FIG. 5, and starts DC/DC conversion.

In step s125, the 4WDCU 60 turns on the clutch 32, and in step s130, the 4WDCU 60 turns on the field current of the electric motor 30, and in step s135, the 4WDCU 60 turns on the 42-V relay (not shown), and in step s140, the 4WDCU 60 turns on the field current of the alternator 44. Thus, in step s145, backlash reduction control of the clutch is completed.

Next, when the 4WDCU 60 detects that an accelerator is turned on in step s150, in step s155, the 4WDCU 60 starts to control the field current of the electric motor 30 and the field current of the alternator 44.

When the 4WDCU 60 detects that an accelerator is turned off in step s160, in step s115, the 4WDCU 60 starts the stop sequence control of the manual 4WD control system. Subsequently, in step s170, the 4WDCU 60 turns off the clutch 32, and in step s175, the 4WDCU 60 turns off the field current of the electric motor 30, and in step s180, the 4WDCU 60 turns off the 42-V relay (not shown), and in step s185, the 4WDCU 60 turns off the field current of the alternator 44. In step s190, the 4WDCU 60 turns off the power-source relay (M4WD RLY), not shown, of the manual 4WD control system, and in step s195, the 4WDCU 60 turns off the DC/DC converter 70. Thus, in step s200, the stop sequence control of the manual 4WD control system is completed.

When a driver of an electric vehicle turns off the manual 4WD switch (M4WD SW) in step s205, and the driver of the same electric vehicle turns off the ignition switch (SW) of the electric vehicle in step s210, the control is completed.

Next, with reference to FIG. 7, the configuration and operations of a vehicle drive device according to another embodiment of the present invention will be explained. The configuration of an electric four-wheel drive vehicle that uses a vehicle drive device according to this embodiment is the same as that shown in FIG. 1.

Figure 7:
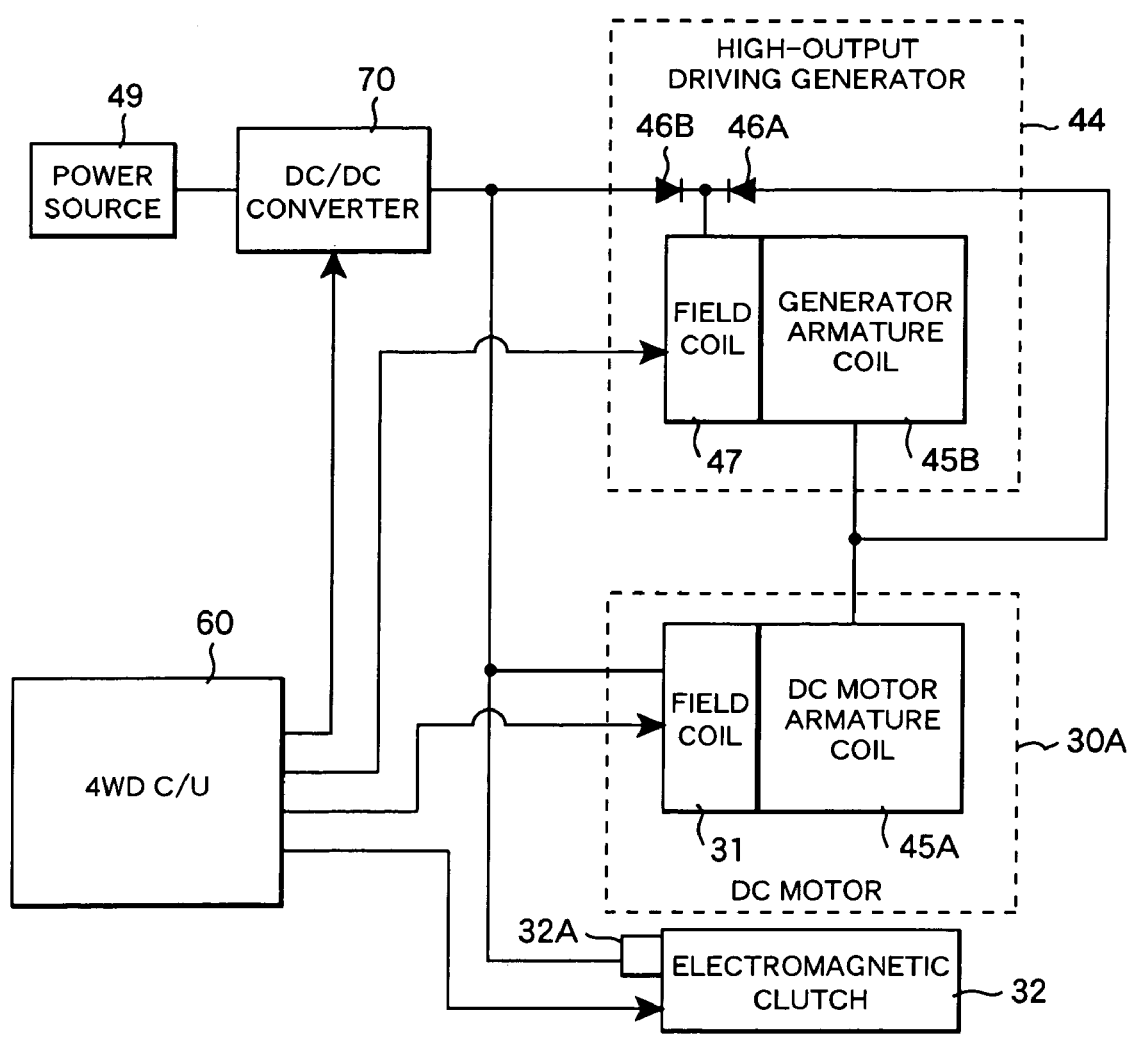
FIG. 7 is a schematic diagram showing the configuration of a vehicle drive device according to another embodiment of the present invention.

FIG. 7 is a schematic diagram showing the configuration of a vehicle drive device according to another embodiment of the present invention. Items in FIG. 7 that have identical numbers to items in FIGS. 1 and 2 are identical.

The characteristic of this embodiment is to use an electric DC motor 30A although a vehicle drive device shown in FIG. 1 or FIG. 2 uses an electric AC motor 30.

The DC/DC converter 70 boosts output voltage of the power source 49 including an auxiliary battery and supplies electric power to the field coil 47 of the generator 44, field coil 31 of the electric DC motor 30A, and the coil 32A of the electromagnetic clutch 32.

Therefore, according to this embodiment, by operating an electromagnetic clutch by means of the output voltage boosted by a DC/DC converter, it is possible to increase the engagement force of an electromagnetic clutch. Specifically, in the configuration in which output torque of the electric motor can be increased by controlling the field voltage of the high-output generator and electric DC motor by means of the output voltage boosted by a DC/DC converter, it is possible to reduce the electromagnetic clutch slipping and effectively use output torque of the electric motor as drive torque.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle drive device comprising
an electromagnetic clutch used for driving the vehicle,
a built-in power source for supplying electric power to said actuator, and
a control means for controlling the drive of said actuator, said vehicle drive device further comprising
a boost means for boosting the output voltage of said built-in power source, wherein
the electric power boosted by said boost means is supplied to said actuator, and
a high-output driving generator driven by an internal combustion engine and
an electric motor driven by the output voltage supplied by said high-output driving generator, wherein
said electromagnetic clutch is located between said electric motor and axles, and the electric power boosted by said boost means is supplied to a field coil of said high-output driving generator and a field coil of said electric motor.

2. A vehicle drive device comprising
an actuator used for driving the vehicle,
a built-in power source for supplying electric power to said actuator, and
a control means for controlling the drive of said actuator, said vehicle drive device further comprising
a boost means for boosting output voltage of said built-in power source,
a high-output driving generator driven by an internal combustion engine, and
an electric alternating current motor driven by the output voltage supplied by said high-output driving generator, wherein
the electric power boosted by said boost means is supplied to a field coil of said high-output driving generator and a field coil of said electric alternating current motor.

3. A vehicle drive device comprising
an actuator used for driving the vehicle,
a built-in power source for supplying electric power to said actuator, and
a control means for controlling the drive of said actuator, said vehicle drive device further comprising
a boost means for boosting output voltage of said built-in power source,
a high-output driving generator driven by an internal combustion engine, and
an electric motor driven by the output voltage supplied by said high-output driving generator, wherein,
the electric power boosted by said boost means is supplied to a field coil of said high-output driving generator and a field coil of said electric motor.

4. A vehicle drive device comprising:
a high-output driving generator driven by an internal combustion engine which drives either one wheel of a front-wheel axle or rear-wheel axle;
an electric alternating current motor driven by output power from the high-output driving generator, and drives another one wheel axle of the front-wheel axle or rear-wheel axle, and
a boost means for boosting the voltage of a auxiliary battery which is a power source for an actuator used to drive the vehicle; wherein
an electric power boosted by said boost means is supplied to a field coil of said high-output driving generator and a field coil of said electric alternating current motor.

5. A vehicle drive device comprising:
a high-output driving generator driven by an internal combustion engine which drives either one wheel of a front-wheel axle or rear-wheel axle;
an electric motor driven by output power from the high-output driving generator, and drives another one wheel axle of the front-wheel axle or rear-wheel axle, and
a boost means for boosting the voltage of a auxiliary battery which is a power source of an actuator used to drive the vehicle; wherein
an electric power boosted by said boost means is supplied to a field coil of said high-output driving generator and a field coil of said electric motor.

6. The vehicle drive device according to claim 5, wherein said actuator is an electromagnetic clutch.

7. The vehicle drive device according to claim 5, wherein said actuator is an electromagnetic brake.

8. The vehicle drive device according to claim 5, wherein said actuator is an electromagnetic limited-slip differential gear.

* * * * *